Dec. 20, 1966  T. C. POWELL  3,292,609
PORTABLE HEATING DEVICES
Filed Aug. 14, 1964
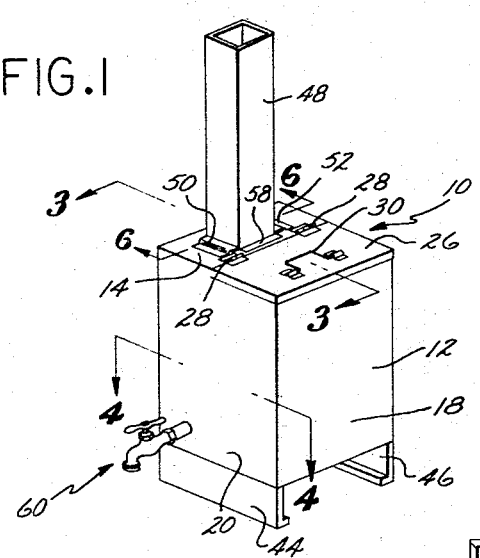
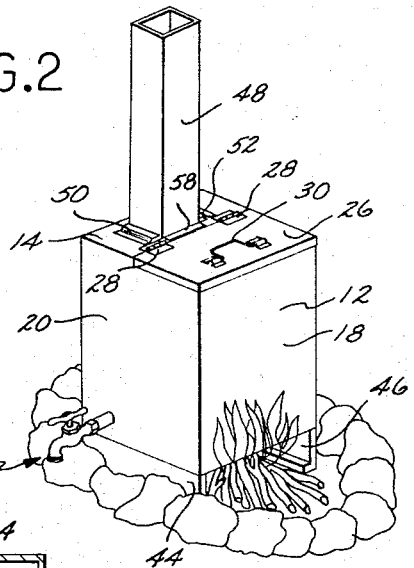
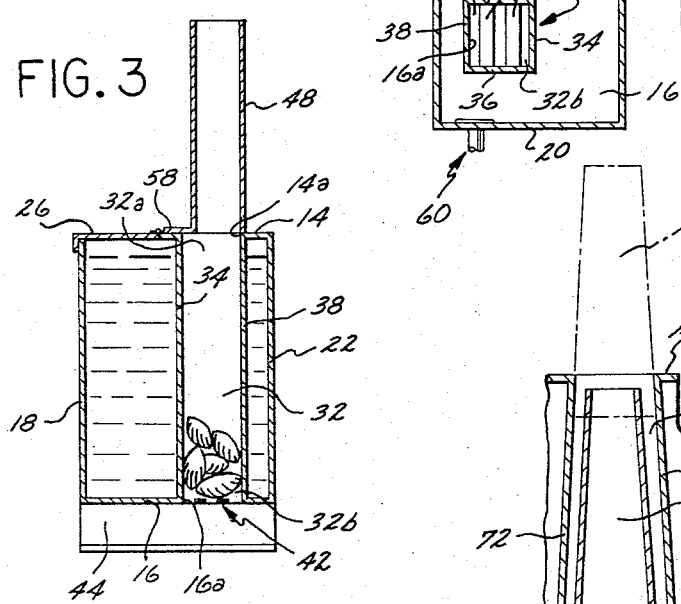
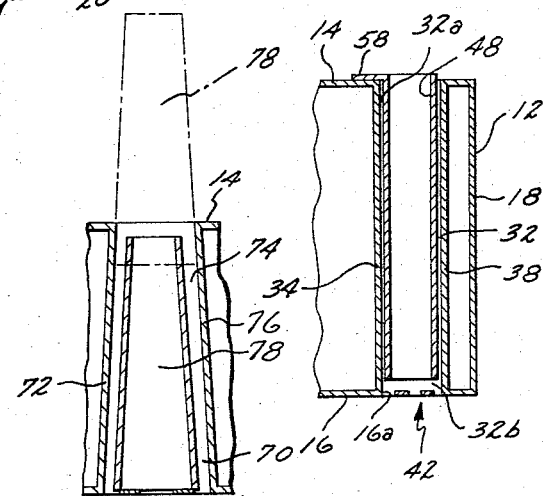
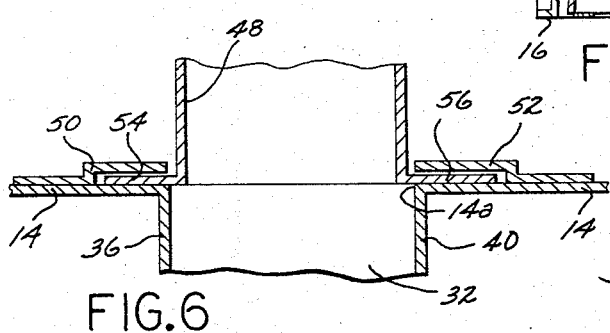
INVENTOR.
TOM C. POWELL
BY
ATTORNEY United States Patent Office 3,292,609
Patented Dec. 20, 1966

3,292,609
PORTABLE HEATING DEVICES
Tom C. Powell, 2351 N. Park, Santa Ana, Calif. 92706
Filed Aug. 14, 1964, Ser. No. 389,657
2 Claims. (Cl. 126—368)

The present invention relates generally to portable heating devices, and more particularly to compact, portable units for heating liquids and the like when on picnics or camping outings.

Within the past several decades, camping has enjoyed increased popularity, until today many families and individuals frequently camp at one or another of the many parks and recreation areas within the United States. Although, in the past, camping was primarily the vacation means for less wealthy families, today, the sport or recreation of camping has become so universal that people of all walks of life and of virtually every type of financial and social background participate in this activity.

Although camping and picnicking has enjoyed such a rapid and sustained growth, equipment used for these purposes has not improved accordingly. That is, although a greater portion of the consumer dollar is now spent for recreational camping, the tenting and eating facilities have not been correspondingly increased in value and desirability.

The present invention satisfies the need for a compact heating device which can be easily stored with the usual camping equipment and paraphernalia, and which can be quickly set up and operated to provide virtually any desired quantity of hot water or other liquid. As will be readily appreciated by those persons acquainted with the sport or recreation of camping, the need for hot water is particularly acute for purposes of washing dishes, clothes, youngsters or virtually any other piece of equipment normally found at a camp site. Due to the relatively limited facilities for cooking, such as portable gas stoves, open fires and the like, it has been realized that the provision of compact and portable heating means which is very efficient and which does not require space on the usual outdoor cook stove would be highly desirable.

It is an object of the present invention to provide a portable heating device which is effective to heat a relatively large quantity of water, or other liquid, with a relatively small amount of fuel.

Another object of the present invention is to provide a portable heating device as characterized above which is sufficiently collapsible so as to be easily stored and carried conveniently from one location to another.

Another object of the present invention is to provide a heating device as characterized above which is extremely efficient in utilizing a small quantity of fuel to heat a given body of liquid.

A further object of the present invention is to provide a portable heating device as characterized above having a combustion chamber which is virtually surrounded by the liquid to be heated.

A still further object of the present invention is to provide a portable heating device as characterized above which is simple and inexpensive to manufacture, and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings in which FIGURE 1 is a perspective view of a portable heating device according to the present invention;

FIGURE 2 is a perspective view showing the heating device of FIGURE 1 positioned over an open fire;

FIGURE 3 is a longitudinal sectional view through the device of FIGURE 1, taken substantially along line 3—3 of FIGURE 1;

FIGURE 4 is a horizontal sectional view through such device, taken substantially along line 4—4 of FIGURE 1;

FIGURE 5 is a fragmentary sectional view through the device, showing the exhaust conduit in its carrying position;

FIGURE 6 is a fragmentary sectional view showing the exhaust conduit in operating position; and FIGURE 7 is a fragmentary sectional view showing a second embodiment of combustion chamber and exhaust conduit.

Like reference characters indicate corresponding parts throughout the several views of the drawings.

Referring to FIGURE 1 of the drawings, there is shown therein a heating device 10 for illustration of the present invention. Such device comprises a container 12 having a top wall 14, a bottom wall 16 and four side walls 18, 20, 22 and 24. Such members may be formed of sheet steel or other metal, or any other appropriate material for providing a container for hot liquids as will hereinafter become readily apparent. In the event sheet metal side walls, top, and bottom are employed for container 12, they may be welded together to provide a water-tight container.

Although not mandatory for successful practice of the present invention, the side walls 18, 20, 22 and 24 may be substantially identical in size and shape so that the horizontal cross-section of the resulting container 12 will be substantially square. It is contemplated, however, within the scope of the present invention, that such cross-section of container 12 may be rectangular or of substantially any other shape, if desired.

Top wall 14 is formed with a through opening 14a, and is provided with a cover 26 to be opened and closed, as desired, for adding liquid to container 12 as will hereinafter become more apparent. In this regard, top wall 14 may be provided with a through opening over which a cover member is operable, or it may be formed to only partially enclose the upper end of container 12, in which event the cover, as shown in FIGURE 1, may be utilized to close the remaining portion of the upper end thereof.

Cover 26 is rotatably fastened to top wall 14 by means of hinges 28. Also, a handle 30 is mounted on cover 26 to facilitate manual opening and closing of such cover.

As shown most clearly in FIGURES 3, 4 and 5, the bottom wall 16 of container 12 is provided with a through opening 16a which is substantially aligned with the through opening 14a in the top wall 14.

Extending between top wall 14 and bottom wall 16 is a combustion chamber 32 having four sheet metal side walls 34, 36, 38 and 40, which are welded together, as shown, to provide an elongated generally tubular assembly which extends the entire height of the container. It is preferable that such wall members 34, 36, 38 and 40 be formed of material which has extremely good heat conducting properties so that the heat within combustion chamber 32 will be readily conducted to the liquid within the container 12. Combustion chamber 32 is provided with open upper and lower end portions as shown at 32a and 32b respectively. A grate 42 formed with horizontally disposed bars 42a is positioned in the lower end 32b of combustion chamber 32, in horizontal alignment with the bottom wall 16 of container 12.

To support the heating device a predetermined distance above ground when in use, there is provided at the bottom of container 12 appropriate support means such as members 44 and 46. Such support members insure the provision of a space between the lower end portion 32b of combustion chamber 32 and the ground on which the device is positioned so that there will be provided in the combustion chamber free circulation of air to support the combustion of fuel therewithin.

Combustible material in substantially any appropriate form may be positioned on the grate 42 within the combustion chamber 12. As shown in FIGURE 3 of the drawings, it has been found most desirable to use combustible material of the type which burns at a rate corresponding to the rate of oxygen supplied thereto. For instance, charcoal in virtually any shape or size, and particularly charcoal briquettes, exhibit this property. As a result, charcoal briquettes can be caused to burn quite rapidly and thus afford a relatively large amount of heat within a very short period of time. This, of course, is extremely desirable in the present device since the relatively large amount of heat within a short period of time is capable of rapidly heating a relatively large quantity of liquid such as water.

An exhaust conduit 48 is removably positioned on the top wall 14 of container 10 immediately over the through opening 14a therein. As such, the exhaust conduit 14 is positioned in a contiguous relation to the combustion chamber 32.

Conduit 48 is formed of four substantially identical sheet metal members arranged to provide elongated conduit having the same general cross-sectional shape as combustion chamber 32. However, for reasons of compactness during storage and transporting of the subject heating device, the cross-sectional size of conduit 48 should be slightly smaller than the cross-sectional size of combustion chamber 32 to enable the former to fit within the latter as will hereinafter become more apparent.

A pair of mounting flanges 50 and 52 are secured to the top wall 14 of container 12 in any appropriate manner as by welding, brazing and the like, or by the use of fastening means such as rivets, bolts and the like. Such flanges are firmly secured to top wall 14 and are disposed in opposed relation on opposite sides of the through opening 14a in top wall 14. Also, such flanges extend approximately the width of the opening 14a.

Positioned on opposite sides of conduit 48 at one end thereof is a pair of mounting arms 54 and 56. Such mounting arms may be attached to the conduit 48 or they may be formed integrally therewith, as desired. In any event, such mounting arms 54 and 56 are slidingly positionable beneath the flanges 50 and 52 respectively. That is, the exhaust conduit 48 is positioned in a contiguous relationship to the combustion chamber 32 merely by sliding the mounting arms beneath the appropriate mounting flanges.

To prevent the products of combustion of the fuel within the combustion chamber from escaping out of the forward portion of the device it may be found desirable to provide an additional flange 58 on the forward side of conduit 48 to close any opening which may exist along the forward edge of the opening 14a in top wall 14 of container 12.

With the exhaust conduit 48 arranged as shown in the contiguous relation to combustion chamber 32, a relatively long column of warm air is provided above the fuel within chamber 32 so that a very strong draft is provided for combustion purposes. That is, the relatively long hot air column above the fuel creates a strong upward force through the combustion chamber thereby bringing large quantities of air to supply oxygen for combustion of the fuel within the chamber. Due to the fact that the combustion chamber is built within the container, substantially surrounded by the liquid to be heated, such intense heat is quickly transferred to such liquid by conduction through the sheet metal wall members 34, 36, 38 and 40 of the combustion chamber.

It has been found that by providing combustion chamber 32 with a substantially square cross-section throughout its length, relatively high efficiency is obtained in heating the water. That is such relatively square cross-section affords optimum wall surface for conducting heat to the water, while maintaining a relatively small cross-sectional area for the combustion chamber. Such smaller cross-sectional area insures that the walls will be heated to a higher temperature with a given amount of fuel due to the closer proximity of such fuel and the walls. Thus a small amount of fuel is thereby used more efficiently in heating the water.

A spigot or other fluid flow control means 60 is mounted in the side wall 20 near the bottom of container 12. Such spigot can be used to remove the heated liquid from within the container.

For reasons of compactness during storage and transporting of the subject heating device, it is preferable if spigot 60 is removable from container 12. As such, when it is desired to store or transport the device, the spigot 60 is removed and is stored within the container itself.

Referring to FIGURE 5 of the drawings, it is seen that the exhaust conduit 48 can be removed from its operating position on top of container 12. This, as above suggested, is accomplished merely by sliding the mounting arms 54 and 56 from beneath the respective mounting flanges 50 and 52. Thereafter, the exhaust conduit 48 is conveniently stored within the container 12 merely by insertion thereof within the combustion chamber 32. To accomplish this, the conduit 48 is inverted so that the usual upper end portion thereof is inserted downwardly in the combustion chamber 32. When this is done, the aforedescribed mounting arms 54 and 56 as well as the flange 58 act as positioning means for retaining the conduit in its proper stored position. Thereafter, the entire heating device can be compactly stored, or it can be transported from one location to another in a very convenient manner.

When it is desired to again use the heating device, it is merely necessary to remove the exhaust conduit 48 from its stored position and to affix the same to the container 12 in contiguous relation to the combustion chamber 32.

FIGURE 7 shows a second embodiment of combustion chamber and exhaust conduit. The container 12 wherein such components are positioned is substantially identical with the container 12 of the other figures of the drawings.

However the combustion chamber 70 of FIGURE 7 is tapered from its smallest cross-section where it is connected to top wall 14 to its largest cross-section where it joins bottom wall 16. Such chamber 70 may be formed of four identically shaped side walls, three of which are shown at 72, 74 and 76 in FIGURE 7.

As such, chamber 70 will be formed with a substantially square cross-section throughout its length.

Positioned within chamber 70 while in its carrying position is a tapered exhaust conduit 78 which is formed with a substantially square cross-section throughout its length and is slidable to an extended position above combustion chamber 70. When raised to its operating position, the lower or larger end portion of conduit 78 engages the upper or smaller end portion of the chamber 70. As such, the conduit 78 becomes "wedged" in its operating position so as to be retained in its extended position by frictional forces.

When it is desired to return conduit 78 to its carrying or retracted position, it is merely necessary to exert sufficient force thereon to push it into chamber 70. As will be readily apparent, tapered conduit 78 is installed initially within chamber 70 through the lower end of the latter prior to grate 42 being provided.

It is thus seen that the present invention provides a portable heating device which is extremely efficient in raising the temperature of a relatively large quantity of water within a relatively short period of time.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A portable heating device comprising in combination, a container formed of sheet metal and having top, bottom and four side walls affording a substantially square cross-section for said container, a cover in said top to be opened for adding liquid to said container, support means for positioning said container a predetermined distance above ground, an elongated combustion chamber within said container comprising four sheet metal wall members extending the height of said container and individually spaced from a separate one of said side walls of said container, said side walls affording a substantially square cross-section for said combustion chamber for optimum heat conductivity to the liquid in said container, a grate in said combustion chamber to retain combustible material therewithin adjacent the liquid in said container, a pair of mounting flanges on the top of said container in opposed relation on opposite sides of the upper end of said combustion chamber, an exhaust conduit formed of sheet metal and having a substantially square cross-section of such size as to loosely fit within said combustion chamber for compactness during storage, a pair of mounting arms on opposite sides of said conduit at one end thereof for engagement individually with said flanges on said container to position said conduit in contiguous relation with the upper end of said combustion chamber, and at least one flange at said one end of said conduit in coplanar relation with said mounting arms to cooperate therewith to effectively cover the upper end of the combustion chamber about the contiguous end of said conduit, whereby said combustion chamber and exhaust conduit are continuous notwithstanding the difference in cross-section thereof.

2. A portable heating device according to claim 1, wherein said mounting arms and flange on said conduit are formed integrally with three of the walls of the exhaust conduit respectively, the other wall of said conduit being aligned with one of the walls of said combustion chamber whereby said combustion chamber and exhaust conduit are caused to be continuous notwithstanding the smaller cross-section of said exhaust conduit.

References Cited by the Examiner

UNITED STATES PATENTS

| | | | |
|---|---|---|---|
| 34,546 | 2/1862 | Chandler | 126—307 X |
| 194,385 | 8/1877 | Tanenbaum | 126—368 |
| 272,599 | 2/1883 | Tappeiner | 126—59 X |
| 729,861 | 6/1903 | Hernfeld | 126—368 |
| 865,579 | 9/1907 | Enfield | 126—9 |
| 1,371,297 | 3/1921 | Canovsky | 126—368 |
| 1,404,808 | 1/1922 | Taylor | 126—9 |
| 1,433,247 | 10/1922 | Tiffany | 126—59 |
| 1,548,486 | 8/1925 | Reeves | 122—155 |

FOREIGN PATENTS

| | | |
|---|---|---|
| 1,350,051 | 12/1963 | France. |
| 102,086 | 11/1916 | Great Britain. |

FREDERICK L. MATTESON, JR., *Primary Examiner.*

ROBERT A. DUA, *Examiner.*